United States Patent
Darvishian

(10) Patent No.: US 9,790,816 B1
(45) Date of Patent: Oct. 17, 2017

(54) SYSTEMS AND METHODS OF CONVERTING HEAT TO ELECTRICAL POWER

(71) Applicant: Masoud Darvishian, Damghan (IR)

(72) Inventor: Masoud Darvishian, Damghan (IR)

( * ) Notice: Subject to any disclaimer, the term of this patent is extended or adjusted under 35 U.S.C. 154(b) by 0 days.

(21) Appl. No.: 15/483,225

(22) Filed: Apr. 10, 2017

(51) Int. Cl.
| | |
|---|---|
| *F01K 25/08* | (2006.01) |
| *F01B 17/02* | (2006.01) |
| *F02C 6/06* | (2006.01) |
| *F01K 27/00* | (2006.01) |
| *F01B 29/10* | (2006.01) |
| *F02C 6/00* | (2006.01) |
| *F02C 6/04* | (2006.01) |
| *F01B 17/00* | (2006.01) |

(52) U.S. Cl.
CPC ............ *F01K 25/08* (2013.01); *F01B 17/00* (2013.01); *F01B 17/02* (2013.01); *F01B 17/022* (2013.01); *F01B 29/10* (2013.01); *F01K 27/00* (2013.01); *F01K 27/005* (2013.01); *F02C 6/00* (2013.01); *F02C 6/04* (2013.01); *F02C 6/06* (2013.01)

(58) Field of Classification Search
CPC ........ F01K 25/08; F01K 27/005; F01K 27/00; F01B 17/022; F01B 17/00; F01B 17/02; F01B 29/10; F02C 6/06; F02C 6/00; F02C 6/04

USPC ......... 60/508, 509, 512, 515, 643, 651, 670, 60/671, 721, 413
See application file for complete search history.

(56) References Cited

U.S. PATENT DOCUMENTS

| | | | | |
|---|---|---|---|---|
| 7,874,155 | B2 * | 1/2011 | McBride | F15B 11/032 60/413 |
| 8,046,990 | B2 * | 11/2011 | Bollinger | H02J 15/006 60/410 |
| 8,495,872 | B2 * | 7/2013 | McBride | F15B 11/06 60/511 |
| 8,572,959 | B2 * | 11/2013 | Ingersoll | F02C 6/16 60/512 |
| 8,850,808 | B2 * | 10/2014 | Ingersoll | F03D 9/028 60/413 |
| 2010/0275590 | A1 * | 11/2010 | Harazim | F04B 17/00 60/508 |

* cited by examiner

Primary Examiner — Hoang Nguyen
(74) *Attorney, Agent, or Firm* — Adli Law Group P.C.

(57) ABSTRACT

This invention presents a method for conversion of heat to electrical power through absorption of heat from any types of fluids with temperatures both higher and lower than 0° C. Heat can be absorbed from fossil or renewable energy resources. The mechanism in this invention uses fluid internal energy and enthalpy difference to generate power, where a reciprocating piston-cylinder system provides the required force to rotate a turbine for power generation.

20 Claims, 5 Drawing Sheets

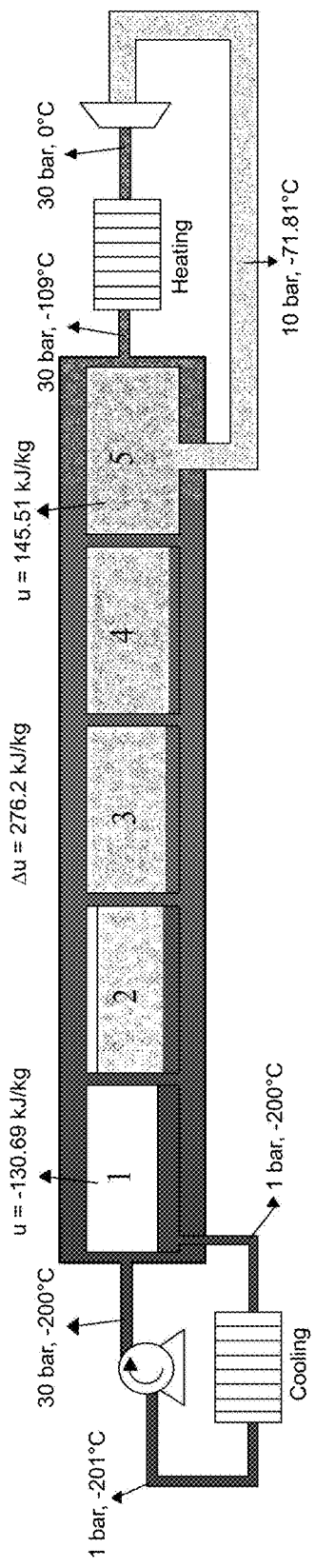
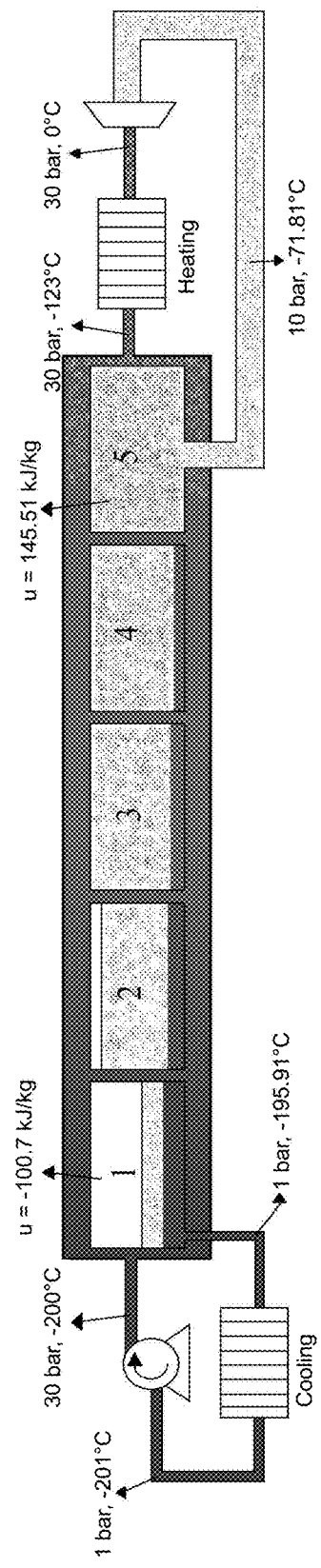
Fig. 4A
Fig. 4B

SYSTEMS AND METHODS OF CONVERTING HEAT TO ELECTRICAL POWER

CROSS-REFERENCE TO RELATED PATENT APPLICATIONS

Embodiments of the present invention relate to Iran Patent Application Serial No. 139550140003014641, filed Feb. 17, 2017, the contents of which are incorporated by reference herein in its entirety and which is a basis for a claim of priority.

FIELD OF THE DISCLOSURE

The present disclosure generally relates to methods and systems for generating electrical power. More specifically, the present disclosure provides methods and systems that convert heat energy to electrical power through absorption of heat from any types of fluid at roughly any temperature.

BACKGROUND OF THE DISCLOSURE

Today, due to the growing demand for different types of energy, various approaches have been utilized for generating electrical power. This electrical power may not be stored due to the high level of power consumption in different countries and its consequent high storage cost. Renewable energy resources such as sunlight, wind, sea waves, and tides are not usually available during a 24-hour period, while a combined-cycle power plant with a low-cost fuel can be used to dynamically generate as much power as required. However, this can lead to irrecoverable complications for humans and the environment.

On the other hand, with operational temperatures range about 100° C. to 1500° C., thermal power plants convert the thermal energy from any fuel type to mechanical energy in order to generate electrical power. This method, in the best-case scenario, converts about 60 percent of the thermal energy to electrical power, leaving the working fluid cooled down.

Accordingly, there exists a need for an improved method and system for converting heat to electrical power that is available all the time, reduces impact to the environment and provides higher percentage of energy conversion.

SUMMARY OF THE DISCLOSURE

One objective of the present disclosure is to provide a method and system for converting heat to electrical power through absorption of heat from any types of material (e.g., fluids) with temperatures both higher and lower than 0° C. Heat can be absorbed from fossil or renewable energy resources. The mechanism in the present disclosure uses fluid's internal energy and enthalpy difference to produce force required to rotate the turbine of a reciprocating piston-cylinder system, thereby generates electrical power.

In accordance with one embodiment of the present disclosure, a system for converting heat to electrical power is disclosed. The system comprises: (1) a pump that compresses a first fluid; (2) a first heat exchanger that uses a second fluid to fix the first fluid's temperature; (3) a plurality of cylinders, where each cylinder comprises a reciprocating piston and is being injected with the first fluid; (4) a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand; (5) a second heat exchanger that transfers energy of the first fluid passing through and existing the plurality of cylinders to the second fluid; (6) a compressor that compresses the second fluid between the first heat exchanger and the second heat exchanger, and the compressed second fluid is cooled down by the second exchanger or other fluid; (7) a first turbine that expands the second fluid and reduces the second fluid's temperature, and transfers the second fluid to the first heat exchanger to maintain low temperature of the first fluid; and (8) a third heat exchanger that absorbs energy from an external fluid to increase energy of the first fluid. The reciprocating piston for each of the plurality of cylinders moves when the first fluid is injected into the plurality of cylinders or when the first fluid's temperature changes in the plurality of cylinders. Since the reciprocating piston for each of the plurality of cylinders is connected to a hydraulic system, power is generated when the reciprocating piston moves.

In accordance with another embodiment of the present disclosure, a method for converting heat to electrical power is disclosed. The method comprises: (1) compressing an external first fluid; (2) fixing or reducing the external first fluid's temperature using a second fluid through a first heat exchanger, which causes the second fluid's temperature to rise; (3) causing the external fluid to be in contact with a plurality of containers, where each of the plurality of containers has a reciprocating piston and contains an internal first fluid, and the external first fluid absorbs the internal first fluid's heat energy through the plurality of containers and causes the internal first fluid to expand; (4) reducing the second fluid's temperature; (5) causing the external first fluid's heat energy to be absorbed by the second fluid through a second heat exchanger; (6) causing the external first fluid to absorb heat energy from air or another fluid through a third heat exchanger; (7) injecting the external first fluid into the plurality of containers, where the external first fluid becomes the internal first fluid; wherein the reciprocating piston moves when the internal first fluid expands and power is generated; and (9) directing the internal first fluid leaving the plurality of containers to the first heat exchanger, where the internal first fluid becomes the external first fluid and the first fluid's temperature is fixed and reduced by the first heat exchanger. The cycle is than repeated to continue power generation.

During the conversion process, drinking water can be produced through absorption of heat from air or water vapor. Moreover, harmful gasses such as methane, NOx, monoxide carbine and carbon dioxide can be condensed and absorbed from the air. The extra power during non-peak hours can be used for water electrolysis to achieve hydrogen to be used as fuel and also to produce desalinated water. Moreover, since the temperature of any external fluids such as air and hydrogen could be highly decreased for liquefaction due to heat absorption from them without consumption of electrical power, both fluids can be used to generate power and run engines.

These and other features, aspects and advantages of the present invention will become better understood with reference to the following drawings, description and claims.

BRIEF DESCRIPTION OF THE DRAWINGS

FIG. 4A and FIG. 4B are schematic diagrams according to an exemplary embodiment of the present disclosure showing power generation procedure.

DETAILED DESCRIPTION OF THE PREFERRED EMBODIMENT(S) AND DISCLOSURE

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

For purpose of present disclosure, the term "fluid" refers to a substance, as a liquid or gas, that is capable of flowing and that changes its shape at a steady rate when acted upon by a force tending to change its shape. Thus, the term fluid may be interchangeable or replaced with "gas" or "liquid" depending on the context.

Broadly, embodiments of the present disclosure generally relate to methods and systems for converting heat to electrical power. In one embodiment, the present disclosure discloses a cooling cycle which generates electrical power while absorbing energy from any fluid at roughly any temperature. In this method, the energy of the fluid is absorbed and converted to electricity, causing the fluid to cool down or even condense. The proposed method is based on the difference between the enthalpy and internal energy of fluids. Few notes and examples are presented below for a better understanding.

By heating a fluid under isobaric and isochoric conditions with the same amount of energy, the temperature of the fluid under both conditions consequently rises. However, in the isobaric condition, the final temperature is lower than that of the isochoric condition, and the reason for which is attributed to the produced work in the isobaric condition.

Therefore, independent of the working fluid, $C_p$ always has larger values than $C_v$ (i.e., $C_p=C_v+R$, where R is gas constant), or in other words, the enthalpy H is greater than the internal energy E (i.e., $H=E+PV$, where P is pressure and V is volume). Due to their higher compressibility, gasses demonstrate this effect more evidently. In order to better explain the disclosed method and system, it is assumed that each cycle is ideal and no heat loss occurs during the process. Also, for purpose of illustration, embodiments below will use nitrogen gas and liquid nitrogen to show how the disclosed method and system work. However, the nitrogen gas and the liquid nitrogen can be interchanged or replaced with other types of fluids (in their gas and/or liquid forms).

Figure 1:
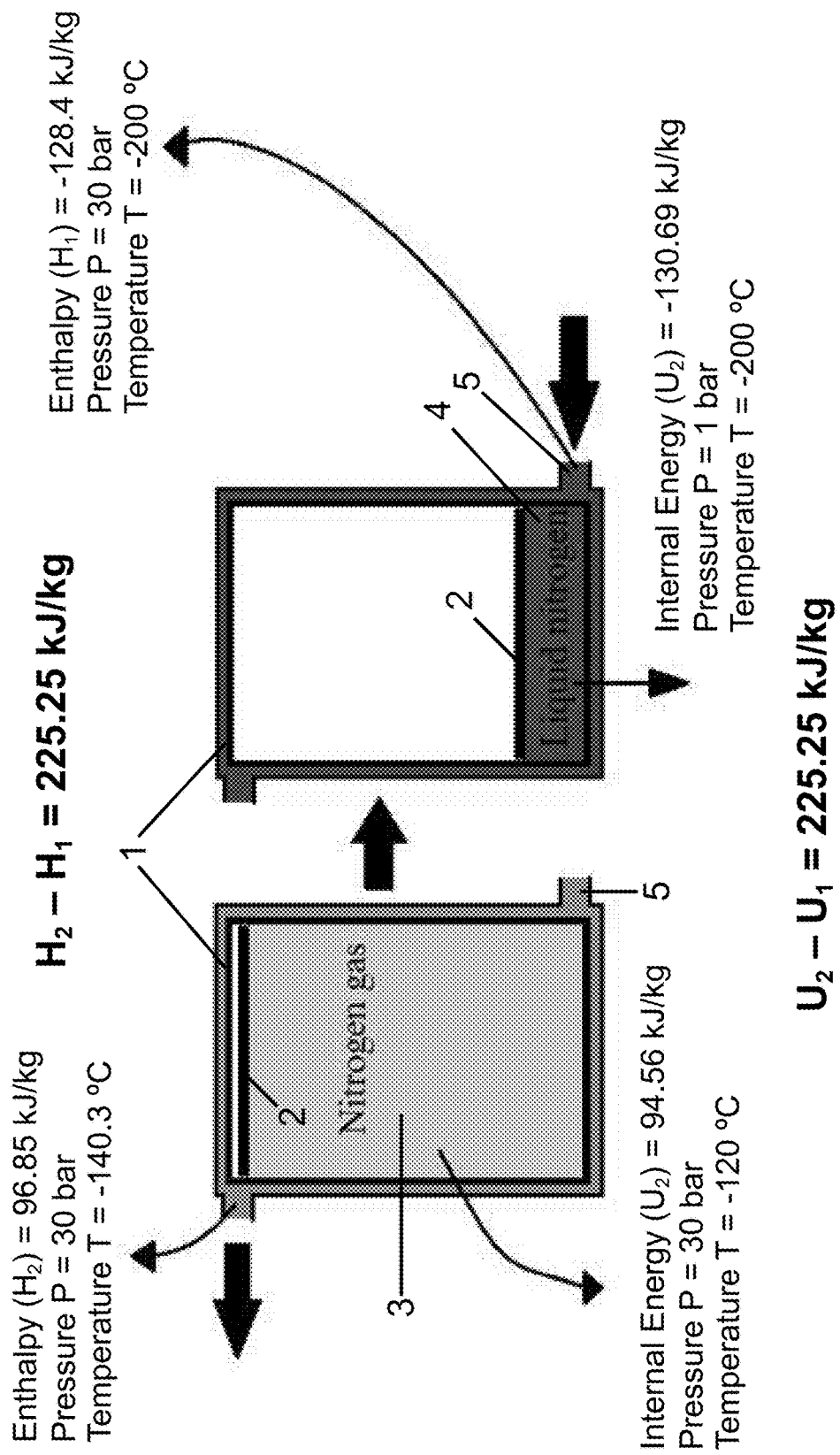
FIG. 1 is a schematic diagram according to an exemplary embodiment of the present disclosure showing basics of electrical power generation.

FIG. 1 shows the basics of electrical power generation according to one embodiment of the present disclosure. Here, nitrogen gas 3 is injected into cylinder 1, and is converted into liquid nitrogen 4. Assuming that during this conversion process, an external fluid 5 (assuming also nitrogen) cools the nitrogen gas 3 down by absorbing its energy, as a result of which the atmosphere (i.e., change in pressure) causes the piston 2 to move down. In this example, the energy difference for the gas contained within the cylinder is 225.25 kJ/kg (e.g., $H_2-H_1=96.85--128.4=225.25$ kJ/kg). Note the source of external fluid 5 can be the same as nitrogen gas 3 and liquid nitrogen 4, this will be demonstrated by a single-phase power generation system shown in FIG. 2.

Now, in case this amount of energy is absorbed by the external fluid 5 (e.g., liquid nitrogen) outside of the cylinder 1 in a pressure of 30 bar and at a temperature of −200° C., the external fluid 5 (e.g., liquid nitrogen) is then converted to gas (e.g., nitrogen gas), reaching a temperature of −140.3° C., which is still lower than −120° C., the temperature of nitrogen gas 3 inside the cylinder 1.

Then, the gas (e.g., nitrogen gas) converted from the external fluid 5 is heated by the air in the room to increase its temperature from −140.3° C. to −120° C. By injecting the nitrogen gas 3 into the cylinder 1, a pressure of 30 bar can be obtained again. This can be done using a pump, which consumes electrical power to complete the cycle. In fact, the temperature difference in an isobaric case is compensated by transferring energy from the environment to the fluid under isobaric conditions, in addition to energy received from the system. The required energy to pump the fluid is considerably less than the energy received from the piston. In fact, given that $h=u+pv$, the energy received from piston is equal to pv, and the internal energy u is stored in the cylinder 1 without changes in order to transfer its energy to the compressed fluid.

The mentioned heat transfer process cannot be fully carried out merely by one cylinder, since the gas contained within the cylinder does not fully cool down and the external fluid cannot fully absorb the energy within the cylinder, as a result of which, the cycle will not be balanced. However, in the case where there are sufficient number of cylinders and adequate heat transfer rate to further facilitate the heat transfer between the external fluid and the fluid inside the cylinder, the cycle will be balanced, helping the fluid inside the cylinder to fully cool down and reach the input temperature of the external fluid. In addition, the cycle should be designed in a way such that $\Delta u \leq \Delta h$, i.e. the variations in specific enthalpy of the compressed fluid must be larger than variations in specific internal energy of the fluid contained within the cylinders under constant-volume conditions, where injection of heat to the cycle should be necessary to compensate the lack of energy due to work received from the cycle, which is considered the most principal method of power generation.

Figure 2:
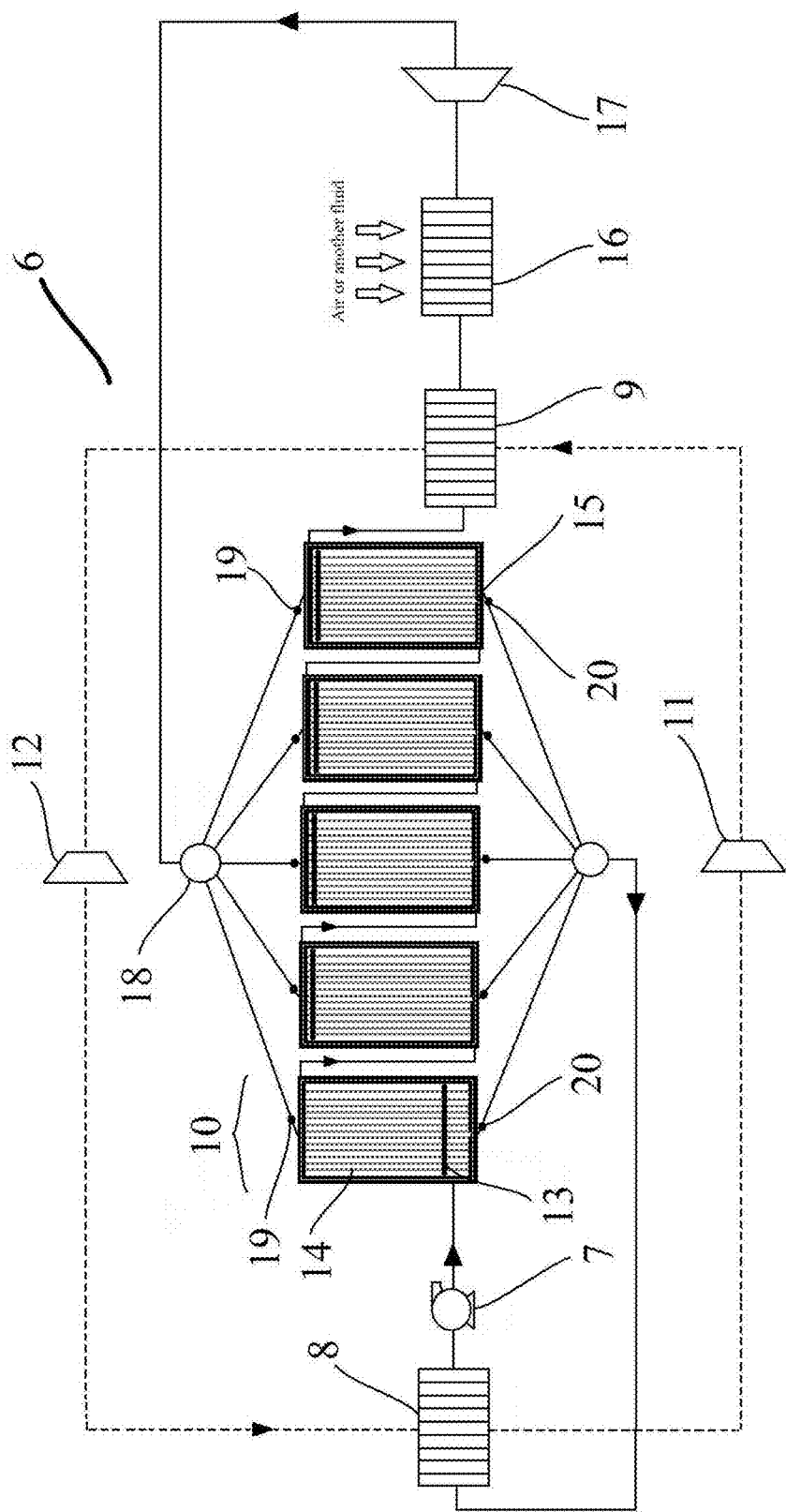
FIG. 2 is a schematic diagram according to an exemplary embodiment of the present disclosure showing a proposed single-phase power generation method using a cooling system.

FIG. 2 is a schematic diagram of a single-phase power generation system 6 utilizing a conventional cooling system according to an exemplary embodiment of the present disclosure. Here, the disclosed power generation system 6 comprises a pump 7, a first heat exchanger 8, a second heat exchanger 9, a plurality of cylinders 10, a plurality of reciprocating pistons 13, a plurality of input flow rate control valves 19, a plurality of output flow control valves 20; a compressor 11, a first turbine 12, a pipe 14, a third heat exchanger 16, a direction control valve 18, and optionally a stirring system 15 and/or a second turbine 17.

The pump 7 is responsible for compressing a first fluid (the path of the first fluid is denoted by solid line). The first fluid can also be referred to as the "working fluid." The first heat exchanger 8 uses a second fluid (the path of the second fluid is denoted by broken line) to fix the temperature of the compressed first fluid, where the first heat exchanger 8 can be installed after the pump 7 depending on the cycle conditions. The second heat exchanger 9 allows the energy to be transferred between the first fluid passing through and exiting the plurality of cylinders 10 and the second fluid from output of the compressor 11. Each of the plurality of cylinders 10 comprises a reciprocating piston (i.e., one of the plurality of pistons 13), an input flow rate control valve (i.e., one of the plurality of input flow rate control valves 19) and an output flow control valve (i.e., one of the plurality of output flow rate control valves 20). The plurality of reciprocating pistons 13 are responsible for transferring the force produced to a hydraulic system for power generation (e.g., force produced during injection of gas into the plurality of cylinders 10 or conversion of liquid and gas in the plurality of cylinders 10). Details of the power generation will be discussed below and illustrated by FIG. 3. The input flow rate control valves 19 controls the input flow rate for the plurality of cylinders 10, and the output flow control valves 20 controls the output flow rate for the plurality of cylinders 10.

The compressor 11 compresses the gas (e.g., gas form of the second fluid) between the first heat exchanger 8 and the second heat exchanger 9, where fluid produced after compression (e.g., after the compressor 11) is cooled down by second heat exchanger 9 or other fluid(s). For example, compressor 11 may consist of several compressors with inter-cooling and uses second heat exchanger 9 to decrease energy consumption. Conversely, the first turbine 12 expands a cooled gas and reduces its temperature, and transfer it to heat exchanger 8 to maintain the low temperature of the compressed first fluid from pump 7. The combination of the compressor 11 and the first turbine 12 can be used to represent the conventional cooling system. The pipe 14 is configured in a way that is in contact with the casing of the plurality of cylinders 10 allowing the compressed first fluid to pass through and contact casings of the plurality of cylinders 10, and to absorb the energy of the fluid (also the first fluid) that is contained within the plurality of cylinders 10 to cause its expansion, where this procedure is carried out after passing through plurality of cylinders 10. Preferably, the compressed first fluid must pass through and contact the plurality of cylinders' 10 casing to enable full energy absorption. The optional stirring system 15 can be implemented within each of the plurality of cylinders 10 to facilitate heat transfer.

The third heat exchanger 16 is responsible for absorbing energy from any external fluid (air or another fluid) to increase energy of the first fluid (before entering turbine or injecting within cylinder). In other words, the third heat exchanger 16 is used to allow the first fluid to absorb energy from another fluid such as air or sea water, thereby generating power from air or sea water. The optional second turbine 17 can be installed after the third heat exchanger 16 and is configured to activate when the cycle works in a balanced condition in which cooling of the fluid within cylinders is easily carried out, consequently causing a decrease in the consumed energy by the cycle to increase the electrical power generated. Note utilizing turbine needs specific calculation such as pressure ratio, input and output temperature to maintain the cool state of the compressed fluid, otherwise when the ratio of generated power to consumed power is low or the cycle is not balanced, the turbine should be removed. Expansion of the first fluid during injection to cylinder could happen in a predicted and limited expansion ratio, so the optional second turbine 17 can be removed under such scenario.

The flow rate and direction control valve 18 regulates the flow, injection and removal of the first fluid from the cylinder. The plurality of input flow rate control valves 19 control the input flow rate for the plurality of cylinders 10 and the plurality of output flow control valves 20 control the output flow rate for the plurality of cylinders 10.

In this embodiment, the external fluid (referring to the first fluid that contacts casings of cylinders 10), which is the same type as the internal fluid (referring to the first fluid that is injected into and contained in the cylinders 10), is initially compressed by the pump 7 and is then cooled down using another cycle (i.e., by first heat exchanger 8). Then, as the external fluid is transferred from one cylinder to another by passing through the pipes 14, its temperature increased, causing it to expand. As a result, the cylinders 10 (or the internal fluid) are cooled down in turn until all of them reach the same temperature as the external (or passing) fluid. After heating (or absorbing energy), the external fluid enters two heat exchangers (i.e., the second heat exchanger 9 and the third heat exchanger 16). The second heat exchanger 9 is responsible for maintaining the cool state of the external fluid, and the third heat exchanger 16 is to increase temperature of the external fluid, which may be carried out through air or any other fluid(s). In the next stage, the external fluid enters a turbine 17 and generates power. Then, as the external fluid is injected into the cylinders 10 and becoming internal fluid, the pistons within the cylinders 10 are moved to generate additional power through another mechanism. To prevent or reduce heat loss, additional insulation system can be installed on the plurality of cylinders 10.

Figure 3:
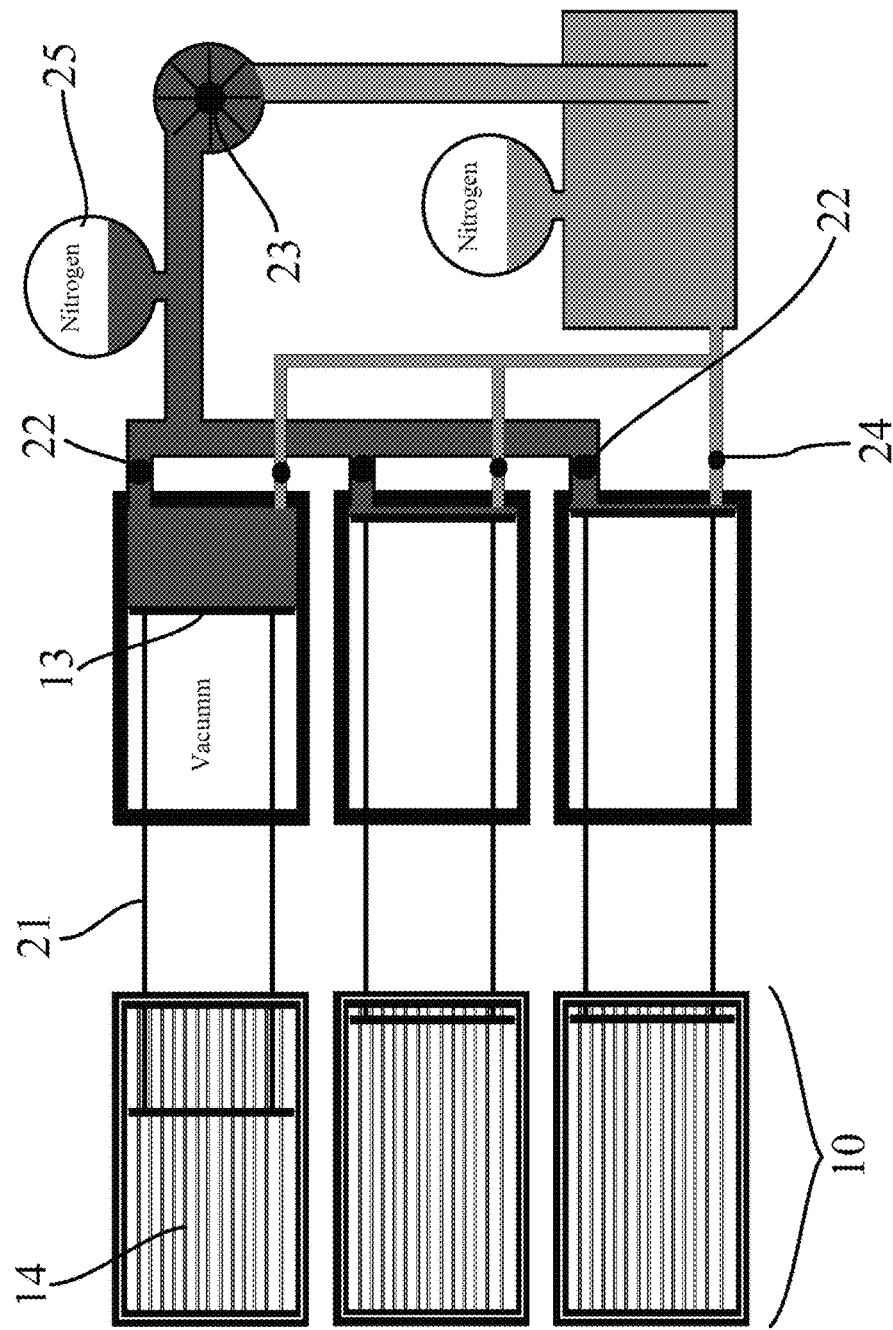
FIG. 3 is a schematic diagram according to an exemplary embodiment of the present disclosure showing the mechanism of force transmission to the hydraulic turbine.

FIG. 3 demonstrates a mechanism of force transmission from cylinders 10 to a hydraulic system according to one embodiment of the present disclosure. Here, the disclosed hydraulic system also has multiple cylinders and pistons, where pistons of the hydraulic system are connected to pistons 13 of the disclosed system through columns 21. The cylinders and pistons designed for the hydraulic system are considerably smaller than the those in the cycle. For each cylinder of the hydraulic system, there is also a valve 22 that controls the direction of the high-pressure flow, and a valve 24 that controls the direction of low-pressure flow. The mechanism further comprises a hydraulic turbine 23, and an accumulator 25 for preventing impact pressure as well as maintaining the pressure.

Since the contact between the cylinders' 10 components and fluids of high temperature difference can cause negative effects on both the power output and the equipment due to thermal shocks, the disclosed hydraulic system uses additional pistons and cylinders for force transmission, where the force is initially transferred to a fluid (e.g., water or oil), and power is generated when the fluid passes through the hydraulic turbine 23. The pressure of the air or the accumulator 25 causes the fluid to be injected into the cylinders of the hydraulic system, and during the procedure of which low-pressure valve 24 is closed, causing the fluid to enter the turbine 23 and consequently generate power. In addition, to prevent or reduce impact to the turbine 23, accumulator 25 can be used to change the operating pressure of the returning fluid.

Two important points should be noted regarding the power generation cycle in the system shown by FIG. 2. First, use of the optional second turbine 17 is not always practical as it may cause instability of the cycle, and change the temperature or form of the output fluid from the coldest cylinder which is required to be condensed and at an appropriate temperature. In practice, the more the energy received from the piston and turbine, the more the energy required to cool down the pumped fluid. Second, in this system, an external cycle created by the conventional cooling system (i.e., compressor 11 and turbine 12), is used to maintain the first fluid's temperature before compressing by pump 7.

However, this cycle can be eliminated. For example, instead of using a conventional cooling system, the disclosed system can employ one or more cycles with a working fluid of lower condensation temperature. Moreover, for the last cycle, any conventional cooling method can be used, in case of which, the new cycle receives its energy from the heat exchanger 8 and the second heat exchanger 9, and the turbine 12 and the compressor 11 of the conventional cooling system are removed from the disclosed system. For instance, the first cycle can employ carbon dioxide as the coolant, for cooling of which another cycle with a working fluid of lower condensation temperature such as methane can be used. Applying the same procedure, next conventional cooling cycles can utilize fluids such as nitrogen, hydrogen, and ultimately helium.

For a more comprehensive understanding of the present disclosure, more explanations are provided below. As stated before, the objective of the present disclosure is to generate electrical power from air or any other fluid of any temperature, including those below zero ° C.

As shown by FIG. 2, cylinders 10 are used in the power generation cycles so that the returned fluid from the turbine (i.e., the second turbine 17) undergoes an isochoric process to generate power, such that the fluid can more easily be converted to liquid by compressed fluid and through pump 7. In other words, the cycle is to be designed such that $\Delta u \leq \Delta h$, i.e. the variations in the enthalpy of the compressed fluid are larger than changes in internal energy of the contained fluid within the cylinder under constant-volume conditions, which is considered the most principal method of power generation.

FIGS. 4A and 4B are schematic views showing exemplary power generation procedures for the system disclosed in FIG. 2. The following relation was used to calculate the variations in the energy of the compressed fluid contained within the cylinders 10:

$$\dot{Q} - \dot{W}_S = \dot{m}_2 u_2 - \dot{m}_1 u_1 + \dot{m}_{out}(h + V^2/2 + gz)_{out} - \dot{m}_{in}(h + V^2/2 + gz)_{in}$$

It is important to note that in the disclosed system and method, all the components are required to be pre-calculated so that the cycle can generate power and maintain its stable operation. Hence, in order to have an economic and feasible cycle, many parameters such as the level of heat transfer by the cylinders to the fluid, minimum and maximum operating temperatures of the cycle, presence or absence of a turbine, turbine compression ratio, pump compression ratio used in compression of the fluid, and sizes of cylinders are of great importance. In order to analyze the method using Aspen HYSYS® software (i.e., a dynamic process simulation software), the heat transfer efficiency of the cylinders for a 100% was initially investigated, then the effect of efficiency drop was studied. The effects of the employed insulator and metals were considered negligible. The analysis was considered in a steady state so that results could not be affected by time.

As shown by FIG. 2, after absorbing energy from cylinders, the fluid leaving the pipe 14 was heated by the exiting hot fluid from the compressor 11 (i.e., the conventional cooling system) and the air in the environment (e.g., the third heat exchanger 16).

To carry out the manual calculations, the present disclosure utilizes Thermophysical Properties of Fluid Systems retrieved from NIST Chemistry WebBook, where the thermodynamic tables for all fluids are presented.

Table 1 below provides the technical data (i.e., cycle conditions) for the embodiment illustrated by FIG. 4A.

TABLE 1

| | |
|---|---|
| Working fluid: | Nitrogen |
| Conventional cooling system working fluid: | Hydrogen |
| Pump efficiency: | 95% |
| Power consumption: | −4.2 kW |
| Turbine efficiency: | 95% |
| Power output: | 71 kW |
| Power generation from piston by injecting 10 bar output gas from turbine: | 37.8 kW |
| Flow rate: | 1 kg/s nitrogen |

Note:
Cooling system power consumption for reducing temperature of liquid nitrogen about 1° C., assumed to be negligible.

Here, in case the entire energy of the cylinders is absorbed, the temperature of the compressed fluid increases from −200° C. to −109° C., finally reaching 0° C. as it is heated by the air. In fact, an amount of 128 kJ/kg is absorbed from the air. The cycle offers a thermal efficiency of 81% by generating roughly 105 kW of electrical power.

Assuming there is a thermal loss of eleven percent (11%) in the system as illustrated by FIG. 4B. At a 100 percent efficiency, the variation in the internal energy of the contained gas within the cylinders was 276.2 kJ/kg, meaning that cylinder (1) contains some uncondensed gas. In order for the cycle to achieve a steady-state cycle, the remaining gas is to be condensed and then pumped to reach temperatures of −201° C. and −200° C., respectively. Table 2 below provides the technical data for the cycle conditions:

TABLE 2

| | |
|---|---|
| Working fluid: | Nitrogen |
| Conventional cooling system working fluid: | Hydrogen |
| Pump efficiency: | 95% |
| Power consumption: | −4.2 kW |
| Turbine efficiency: | 95% |
| Pressure ratio: | 30/10 bar |
| Power output: | 71 kW |
| Power generation from piston by injecting 10 bar output gas from turbine: | 37.8 kW |
| Turbine and compressor efficiency for conventional cooling system: | 95% |
| Pressure ratio of compressor: | 1/80 bar |
| Power consumption: | −193 kW |
| Pressure ratio of turbine: | 80/1 bar |
| Power production: | 83 kW |
| Flow rate: | 200 kg/hr or 0.05555 kg/s Hydrogen |
| RESULT | |
| Power production: | 191.8 kW |
| Power consumption: | 197.2 kW |
| Overall power generation: | −5.4 kW |

Note:
A conventional cooling system is demonstrated in FIG. 2 as well as compressor 11 and turbine 12.

As shown, no electrical power is practically generated in this cycle, and instead, power is consumed. Consequently, the following three methods can be used to generate electrical power and increase thermal efficiency:

1. Employing multistage compressors and inter-cooling to reduce power consumption of the cycle.
2. Manufacturing cylinders with higher heat transfer capabilities to increase thermal efficiency and provide better insulation.

3. Employing a fluid with a lower operating point temperature compared to nitrogen, e.g. hydrogen, in the proposed cycle, so that in the second cycle, heat is absorbed from the exiting nitrogen from cylinder 1.

Cooling of the hydrogen cycle should be carried out at a temperature of roughly −250° C.

Generally, in case a single-stage cycle is used, the heat transfer efficiency should be higher than 90 percent so that power can be generated. On the other hand, in the case of a low efficiency, the amount of output water by the cycle exceeds its generated power.

The following results were obtained for a single-stage power generation cycle with a heat transfer efficiency of 100 percent: For nitrogen with a flow rate of 1 kg/s, roughly 105 kW of electrical power as well as 75 kg/hr water can be generated from air, assuming 7 g of water per cubic meter of air, i.e. a relative humidity of 30%. In case fossil fuels such as natural gas are used instead of air as the heat source, the present cycle is capable of achieving more electrical power than current 63 percent record.

On the other hand, there are specific difficulties involved in this method, especially in utilizing piston-cylinder which further increases maintenance costs. Employing this cycle to generate power from air or sea water can be advantageous compared to the existing power generation methods with their specific problems.

During the conversion process, drinking water can be produced through absorption of heat from air or water vapor. For example, drinking water can be produced by condensing the humidity in air by passing the air from the third heat exchanger 16, or condensing steam water at a pressure of 1-5 kPa or higher pressure by passing through the third heat exchanger 16. Moreover, harmful gasses such as methane, NOx, monoxide carbine and carbon dioxide can be condensed and absorbed from the air. Extra electricity during non-peak load can also be used to desalination of water or electrolysis of water to achieve hydrogen and oxygen. In brief, the third heat exchanger 16 performs cooling that leads to condense or reducing temperature of fluids or devices. If the third heat exchanger 16 absorbed heat from air, it could purify air by condensing harmful gases or overall gas liquefaction.

Figure 5:
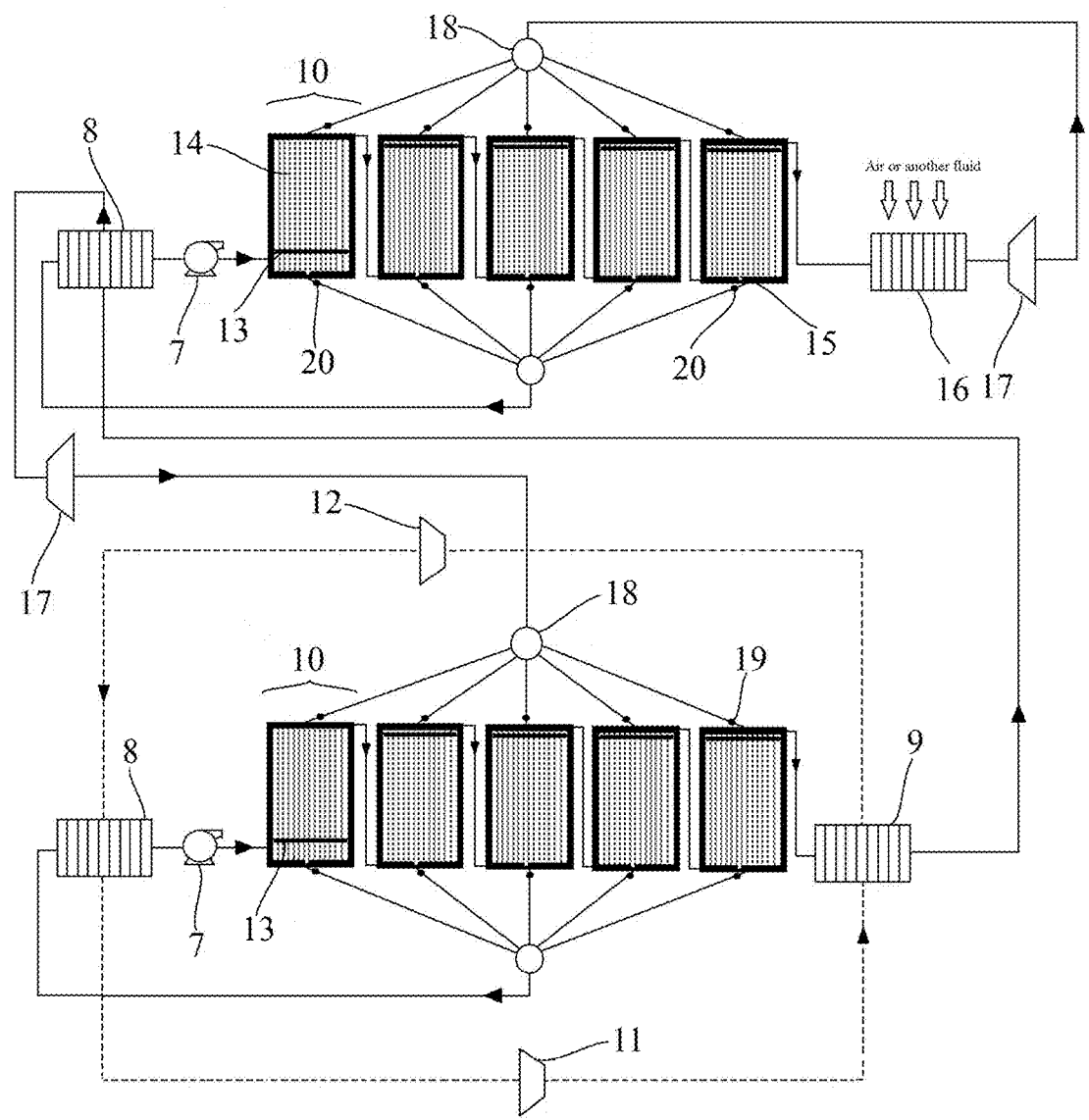
FIG. 5 is a schematic diagram according to an exemplary embodiment of the present disclosure showing a dual-stage power generation cycle accompanied by a single-stage conventional cooling system.

FIG. 5 illustrates a dual-stage power generation cycle accompanied by a single-stage conventional cooling system accordingly to another embodiment of the present disclosure. Here, the conventional cooling system (compressor 11 and turbine 12) used by the disclosed system in FIG. 2 is replaced by the same invented concept to absorb heat from first cycle to fix the temperature of first fluid before the pump using dual-stage or multipole-stage of the concept. All components are similar, but their working fluids are different. The compressed fluid of the lower cycle absorbs the required energy for expansion from the upper cycle, which works in a higher operating temperature. The increased number of repeated cycles increases the overall efficiency of the cycles, since there are no compressors, which consume electrical power, are used in the upper conventional cooling system, as demonstrated.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A system for converting heat to electrical power comprising:
   a pump that compresses a first fluid;
   a first heat exchanger that uses a second fluid to fix the first fluid's temperature;
   a plurality of cylinders, where each cylinder comprises a reciprocating piston and is being injected with the first fluid;
   a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand;
   a second heat exchanger that transfers energy of the first fluid passing through and existing the plurality of cylinders to the second fluid;
   a third heat exchanger that absorbs energy from an external fluid to increase energy of the first fluid;
   wherein the reciprocating piston for each of the plurality of cylinders moves when the first fluid is injected into the plurality of cylinders or when the first fluid's temperature changes in the plurality of cylinders; and
   wherein the reciprocating piston for each of the plurality of cylinders is connected to a hydraulic system and power is generated when the reciprocating piston moves.

2. The system of claim 1 further comprises a stirring system implemented within each of the plurality of cylinders to facilitate heat transfer.

3. The system of claim 1 further comprises a compressor that compresses the second fluid between the first heat exchanger and the second heat exchanger, and the compressed second fluid is cooled down by the second exchanger or other fluid and a first turbine that expands the second fluid and reduces the second fluid's temperature, and transfers the second fluid to the first heat exchanger to maintain low temperature of the first fluid.

4. The system of claim 3 further comprises a second turbine installed after the third heat changer that generates additional electrical power.

5. The system of claim 1 further comprises a flow rate and direction control valve that regulates flow rate, injection and removal of the first fluid from the cylinder.

6. The system of claim 1, wherein each of the plurality of cylinders has an input flow rate control valve that controls the input flow rate of the first fluid.

7. The system of claim 1, wherein each of the plurality of cylinders has an output flow rate control valve that controls the output flow rate of the first fluid.

8. The system of claim 1, wherein the plurality of cylinders and the pipe further comprises an insulation system for preventing or reducing heat loss.

9. The system of claim 1, wherein after expansion of the first fluid and absorbing entire energy of the first fluid contained within the plurality of cylinders, the first fluid is heated using the second heat exchanger until it reaches the same temperature as the fluid contained in cylinder with highest temperature.

10. The system of claim 1, wherein the reciprocating piston for each of the plurality of cylinders starts to move after injection of the first fluid and transfers its energy to a linear generator or another fluid to allow generation of power through another hydraulic cycle using hydraulic turbine and generator.

11. The system of claim 1, wherein the third heat exchanger is used to produce water, hydrogen and performs cooling, gas liquefaction and desalination of water using the first fluid with low condensation temperatures.

12. The system of claim 1, wherein the third heat exchanger is used to produce drinking water by condensing humidity in an air by passing the air to the third heat exchanger, or condensing steam water at a pressure of 1-5 kPa or higher by passing the steam water through the third heat exchanger.

13. A system for converting heat to electrical power comprising:
  a pump that compresses a first fluid;
  a first heat exchanger that uses a second fluid to fix the first fluid's temperature;
  a plurality of cylinders, where each cylinder comprises a reciprocating piston and is being injected with the first fluid;
  a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand;
  a stirring system implemented within each of the plurality of cylinders to facilitate heat transfer
  a second heat exchanger that transfers energy of the first fluid passing through and existing the plurality of cylinders;
  a compressor that compresses the second fluid between the first heat exchanger and the second heat exchanger, and the compressed second fluid is cooled down by the second exchanger or other fluid;
  a first turbine that expands the second fluid and reduces the second fluid's temperature, and transfers the second fluid to the first heat exchanger to maintain low temperature of the first fluid;
  a third heat exchanger that absorbs energy from any external fluid to increase energy of the first fluid;
  a flow rate and direction control valve that regulates flow rate, injection and removal of the first fluid from the cylinder;
  wherein each of the plurality of cylinders has an input flow rate control valve that controls the input flow rate of the first fluid;
  wherein each of the plurality of cylinders has an output flow rate control valve that controls the output flow rate of the first fluid;
  wherein the reciprocating piston for each of the plurality of cylinders moves when the first fluid is injected into the plurality of cylinders or when the first fluid's temperature changes in the plurality of cylinders; and
  wherein the reciprocating piston for each of the plurality of cylinders is connected to a hydraulic system and power is generated when the reciprocating piston moves.

14. The system of claim 13, wherein the plurality of cylinders is responsible for both expansion of the compressed first fluid through the pipe and condensing the first fluid after receiving work and power generation from the first fluid simultaneously.

15. The system of claim 13, wherein after expansion of the first fluid and absorbing entire energy of the first fluid contained within the plurality of cylinders, the first fluid is heated using the second heat exchanger until it reaches the same temperature as the fluid contained in cylinder with highest temperature.

16. The system of claim 13, wherein the reciprocating piston for each of the plurality of cylinders starts to move after injection of the first fluid and transfers its energy to a linear generator or another fluid to allow generation of power through another hydraulic cycle using hydraulic turbine and generator.

17. A method for converting heat to electrical power comprising:
  compressing an external first fluid;
  fixing or reducing the external first fluid's temperature using a second fluid through a first heat exchanger, which causes the second fluid's temperature to rise;
  causing the external fluid to be in contact with a plurality of containers, where each of the plurality of containers has a reciprocating piston and contains an internal first fluid, and the external first fluid absorbs the internal first fluid's heat energy through the plurality of containers and causes the internal first fluid to expand;
  reducing the second fluid's temperature;
  causing the external first fluid's heat energy to be absorbed by the second fluid through a second heat exchanger;
  causing the external first fluid to absorb heat energy from air or another fluid through a third heat exchanger;
  injecting the external first fluid into the plurality of containers, where the external first fluid becomes the internal first fluid;
  wherein the reciprocating piston moves when the internal first fluid expands and power is generated; and
  directing the internal first fluid leaving the plurality of containers to the first heat exchanger, where the internal first fluid becomes the external first fluid and the first fluid's temperature is fixed and reduced by the first heat exchanger.

18. The method of claim 17, wherein the reciprocating piston for each of the plurality of cylinders starts to move after injection of the external first fluid and transfers its energy to a linear generator or another fluid to allow generation of power through another hydraulic cycle using a hydraulic turbine and generator.

19. The method of claim 17, wherein after the external first fluid absorbs entire energy of the internal first fluid, the first external fluid is heated using the second heat exchanger until it reaches the same temperature as the internal first fluid contained in one of the plurality of cylinders with highest temperature.

20. The system of claim 17 further comprises producing water, hydrogen or performing cooling, gas liquefaction and desalination of water using the first external fluid with low condensation temperatures through the third heat exchanger.

* * * * *